United States Patent [19]
Rue et al.

[11] Patent Number: 4,719,584
[45] Date of Patent: Jan. 12, 1988

[54] DUAL MODE VIDEO TRACKER

[75] Inventors: Arthur K. Rue, Rancho Palos Verdes; Gordon T. Pope, Culver City; Earl L. Emerson, Placentia, all of Calif.

[73] Assignee: Hughes Aircraft Company, Los Angeles, Calif.

[21] Appl. No.: 718,602

[22] Filed: Apr. 1, 1985

[51] Int. Cl.[4] .................... H04N 7/18; G06G 7/48
[52] U.S. Cl. ............................ 364/516; 364/518; 358/126
[58] Field of Search ................ 364/514–517, 364/518, 728; 358/105, 125, 126

[56] References Cited
U.S. PATENT DOCUMENTS

| | | | |
|---|---|---|---|
| 3,953,670 | 4/1976 | Prince | 358/125 |
| 4,060,830 | 11/1977 | Woolfson | 358/126 |
| 4,133,004 | 1/1979 | Fitts | 244/3.16 |
| 4,189,747 | 2/1980 | Funari | 358/126 |
| 4,213,150 | 7/1980 | Robinson et al. | 358/166 |
| 4,283,767 | 8/1981 | Rountree | 364/728 |
| 4,364,089 | 12/1982 | Woolfson | 358/126 |
| 4,368,456 | 1/1983 | Forse et al. | 364/728 |
| 4,553,260 | 11/1985 | Belt et al. | 364/752 |

*Primary Examiner*—Errol A. Krass
*Assistant Examiner*—Brian M. Mattson
*Attorney, Agent, or Firm*—Ronald L. Taylor; A. W. Karambelas

[57] ABSTRACT

Target or scene tracking capability is provided by a dual mode video tracker which includes both a correlation processor (30) and a centroid processor (32) for processing incoming video signals representing the target scene (20) and for generating tracking error signals over an entire video frame or a selected mode thereof. A microcomputer (26) controls the operation of the correlation and centroid processors, as well as a preprocessor (28) which preconditions the incoming video signals. The tracker operates in any of several modes in which the correlation and centroid processors function either independently or cooperatively with each other. The correlation processor generates a reference map in pixel format which is used to produce azimuth and elevation optimal weighting values for each pixel in the field-of-view. The reference map is recursively updated. The track gate for the correlation processor is automatically sized using a gradient function derived from the optimal weighting values. The gradient function is also employed along with difference video to determine correlation tracking status. The correlation and centroid tracking errors may be combined to form a composite signal defining a true complementary function.

16 Claims, 12 Drawing Figures

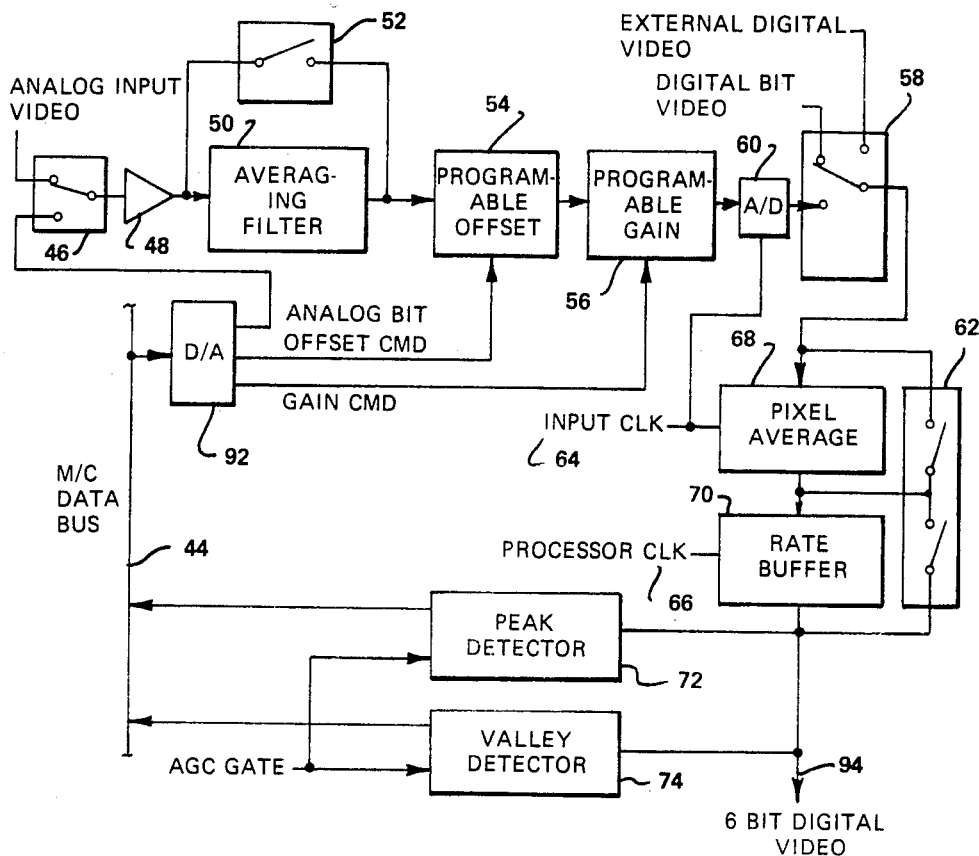
*Fig-2*
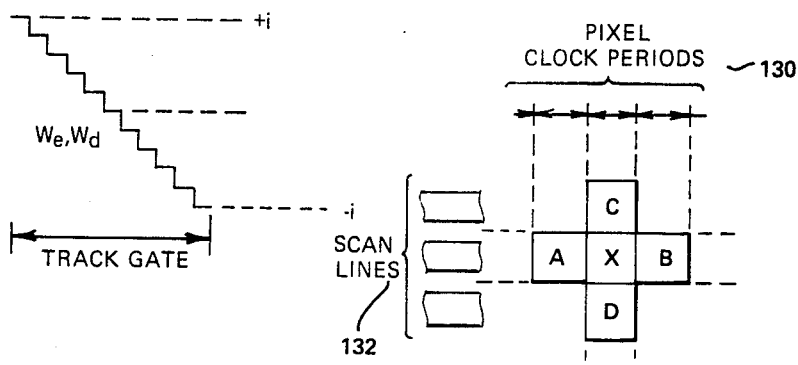
*Fig-4*
*Fig-6*

MEMORY IS CLOCKED IN
SYNC WITH INPUT VIDEO
PIXELS $W_1$ DETERMINES
REFERENCE "LIFETIME"

DUAL MODE VIDEO TRACKER

BACKGROUND OF THE INVENTION

The present invention broadly relates to video trackers for tactical system applications, and deals more particularly with a tracker having both correlation and centroid video processors.

Tactical system applications for video trackers require high performance even where background and foreground clutter objects compete with the target of interest. Additonally, these systems must satisfactorily perform under dynamic conditions where the relative aspect angles and range to the target are continuously changing, and where image roll about the track sensor line-of-sight may be quite severe.

Video tracking processors have been devised in the past which utilize a variety of processing techniques or algorithms such as centroid, area balance, edge and numerous correlation tracking implementation concepts. Most of these video tracking processors possess characteristics which render them unsuitable for use in combination with each other in a "dual mode" operation. For example, edge and area balance algorithms are either noisy or lack well defined target shapes independent of error scale factors. Many correlation algorithm implementations do not provide satisfactory performance when tracking the scene changes on a dynamic basis; consequently, when these types of correlation algorithms are used in conjunction with other tracking processors in a dual mode role, there is excessive dependence on the alternate tracking algorithm. Additionally, when targets which are moving relative to the background are being tracked, it is extremely desirable to position a tracking gate around the target of interest thereby excluding the stationary background. However, techniques for deriving meaningful track gates for many correlation processing algorithms do not exist or rely on externally derived data that are measures of parameters which are not fundamental or relevant to correlation processing.

Video tracking processors of the type described above are normally designed to accept a specific video scan and interlace video format. Thus, if tracking sensors are employed which yield a video format different from that normally accepted by the tracking processor, the processor design must be modified or, alternatively, the input video format must be scan converted to the required video format in order to be processed. In the event that scan conversion is required, a significant processing delay is introduced, thereby limiting the track loop bandwidth and degrading the tracking performance potential under dynamic conditions. Additionally, the scan conversion process often obscures scene spacial sampling intrinsic to the sensor being used and introduces video artifacts and/or spatial and temporal sampling interactions that are deleterious to the generation of proper tracking error measurements.

Ideally, it would be desirable to provide a video tracker having two video tracking processors of different types each of which is particularly suited to provide high performance in a given set of tactical applications, and which is readily suitable for use with various scanning and interlace formats.

Both centroid and correlation type video tracking processors are well known in the art. For example, U.S. Pat. No. 4,133,004 issued Jan. 2, 1979 to Fitts discloses a video correlation tracker which employs a recursive reference to calculate tracking error computations. the correlation tracker disclosed in the Fitts patent includes a circuit for generating a reference map in pixel format. Reference map pixel information derived from previous video frames is stored in a recursive memory to allow the calculation of azimuth and elevation optimal weighting values for each pixel in the field of view. The difference between the intensity value for each video pixel being received during the current frame and the intensity value for the corresponding reference map pixel is multiplied by an appropriate weighting function. Each resultant product is then combined in an accumulator to form azimuth and elevation correlation error signals which are composite indications of the frame-to-reference correlation over the designated track gate area which can be as large as the entire field of view (FOV), less a one pixel border. The weighting factors for each pixel are also combined and accumulatively added over the entire image plane to form three adaptive scale factors at the end of each frame which are combined with the azimuth and elevation correction error signals to eliminate cross coupling and generate cross-coupling-free correlation error signals.

The video correlation tracker disclosed in the Fitts patent mentioned above is particularly well suited to dynamic applications where scene aspect angles, range and scene roll orientation about the line-of-sight change rapidly.

BRIEF SUMMARY OF THE INVENTION

According to the present invention, a dual mode video tracker is provided which employs both a correlation and centroid type video processor which are automatically controlled in a manner such that the processor best suited for tracking a particular scene is automatically selected. Additionally, the video tracker includes a microcomputer and a video preprocessor. The video preprocessor acts as an interface device for conditioning the analog input video signals from the tracking receiver/sensors prior to their delivery to the correlation and centroid processors. The microcomputer controls the transfer of video data, calculates tracking error parameters and executes both individual processor control functions and overall mode control which includes selection of the processor yielding the best tracking performance.

The video tracker can be operated in any of the following tracking modes:

(1) Competitive
(2) Complementary
(3) Difference Video, and
(4) Very Low SNR (signal-to-noise ratio).

In the competitive mode of operation, the centroid and correlation processors are used to independently track the designated target and the processor which yields the "best" tracking performance is selected for actual tracking system control. Independent track status indications derived for the centroid and correlation processors along with track gate size considerations form the basis for active processor selection. In the case of the centroid processor, the number of pixels in the track gate that may pass the selected threshold along with the ratio of the number of track gate pixels passing the threshold to the number of border gate pixels passing threshold establishes the track status. For the correlation processor, the ratio of the difference video sum to the difference video gate area along with the magnitude of the gradient sum and the average value of the gradient sum over the gradient gate established the track status.

In the competitive mode, there are four possible tracking states:
  (1) Track Initiate,
  (2) Track Maintenance
  (3) Coast, and
  (4) Loss of Lock.

The tracking sequence starts when the operator has positioned the target of interest at the desired location within the field-of-view and has executed a track initiated command. From this point, tracker operation is fully automatic unless the tracking run is terminated by the operator or the loss of lock state is entered whereupon a reacquisition process is initiated or pointing control of the systems is automatically returned to the operator. As previously indicated, track state control transitions are determined by centroid and correlation track status indications. Additionally, transitions can come about due to a violation of gate size constraints or track point misalignments that may arise while the non-active processor is operating on an in-raster track mode. After the acquisition sequence is initiated for a processor, a track valid indication is generated when a satisfactory track is established. The processor is then a candidate for active tracking control.

In the complementary mode of operation, the correlation recursive reference video is processed by the centroid processing function and the correlation and centroid track error are simultaneously combined to yield a single tracking control error signal for each axis.

In the difference video mode, the tracker utilizes the correlation processor difference video parameter to automatically acquire moving targets via centroid processing. Finally, in the very low SNR operating mode, the correlation recursive reference video is utilized to enhance the video SNR for centroid processing.

One significant feature of the invention resides in the provision of automatic track gate sizing for the correlation processor by using a gradient function which is formed from the correlation weighting function data. The edges of the gate are determined by summing the absolute values of the azimuth and elevation weighting functions and then accumulating these sums over a gradient gate and adjusting each gate edge such as to maximize the average value of the sum over the gated area.

Another significant feature of the invention involves a technique of determining the tracking status of the correlation processor by combining the magnitude of the gradient function and the magnitude of the correlation difference video. This feature, when combined with the centroid processing function and the centroid track status indicators provides a means for implementing a fully automatic tracking processor. In the comparative mode, the two independent track status indicators provide the means for selecting the "best" processor for the pointing control system.

Still another feature of the invention resides in the technique of combining the correlation and centroid tracking errors to form a composite error signal which is a true complementary function. Finally, the video tracker of the present invention is suitable for use with sensors employing various forms of interlaced spatial scanning and video data formats, including unidirectional and bidirectional scanning.

BRIEF DESCRIPTION OF THE DRAWINGS

In the drawings, which form an integral part of the specification and are to be read in conjunction therewith and in which like reference numerals are employed to designate identical components in the various views:

FIG. 2 is a combined block and schematic diagram of the video preprocessor;

FIG. 4 is a graph showing the relationship between the centroid processor linear weighting functions, $W_e$ and $W_d$, and track gate size;

FIG. 6 is a diagrammatic view showing the spatial relationship of pixels used in computing the correlation weighting functions for a pixel "x";

DETAILED DESCRIPTION OF A PREFERRED EMBODIMENT

Figure 1A:
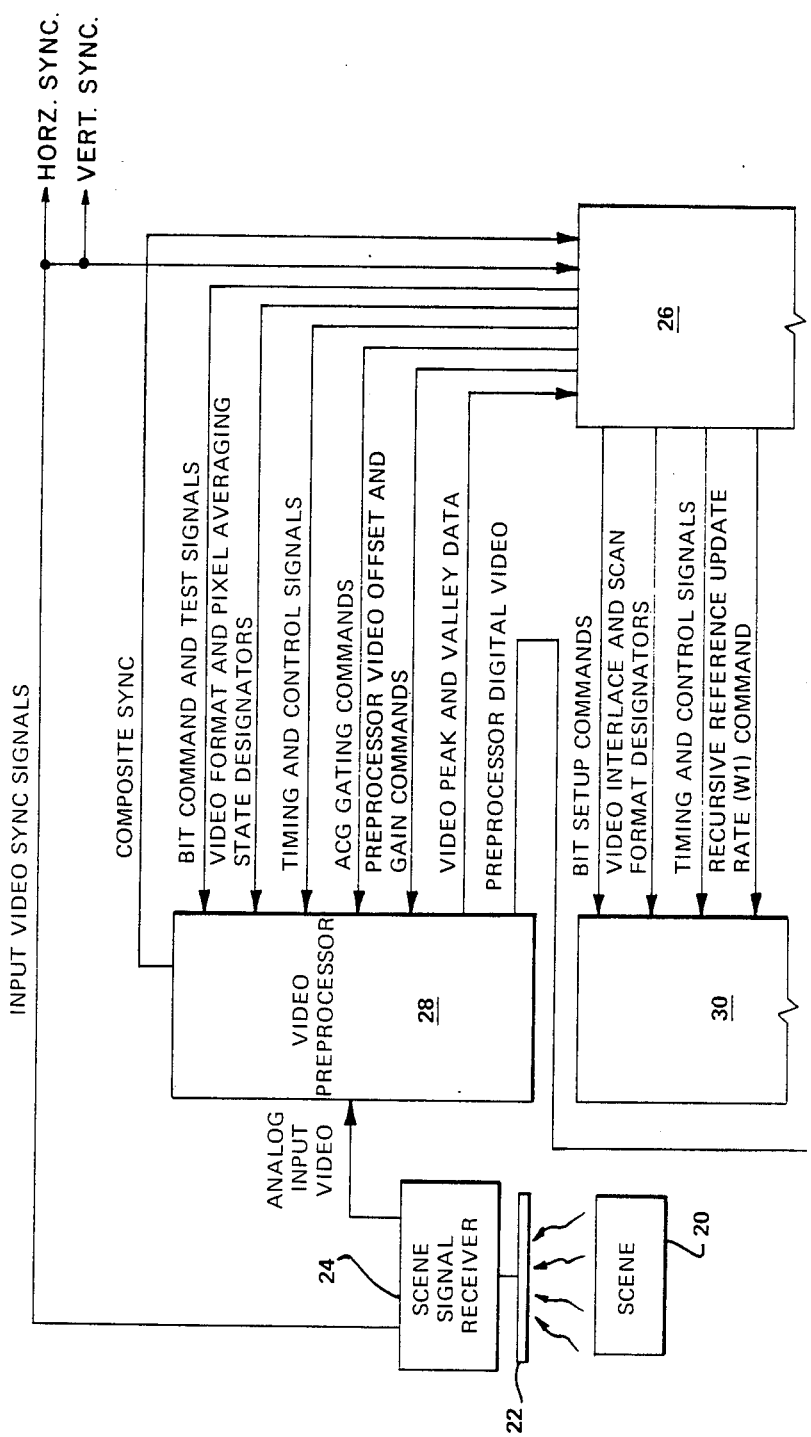
FIGS. 1A and 1B, taken together, provide an overall block diagram of the dual mode video tracker which forms the preferred embodiment of the present invention.
Figure 1B:
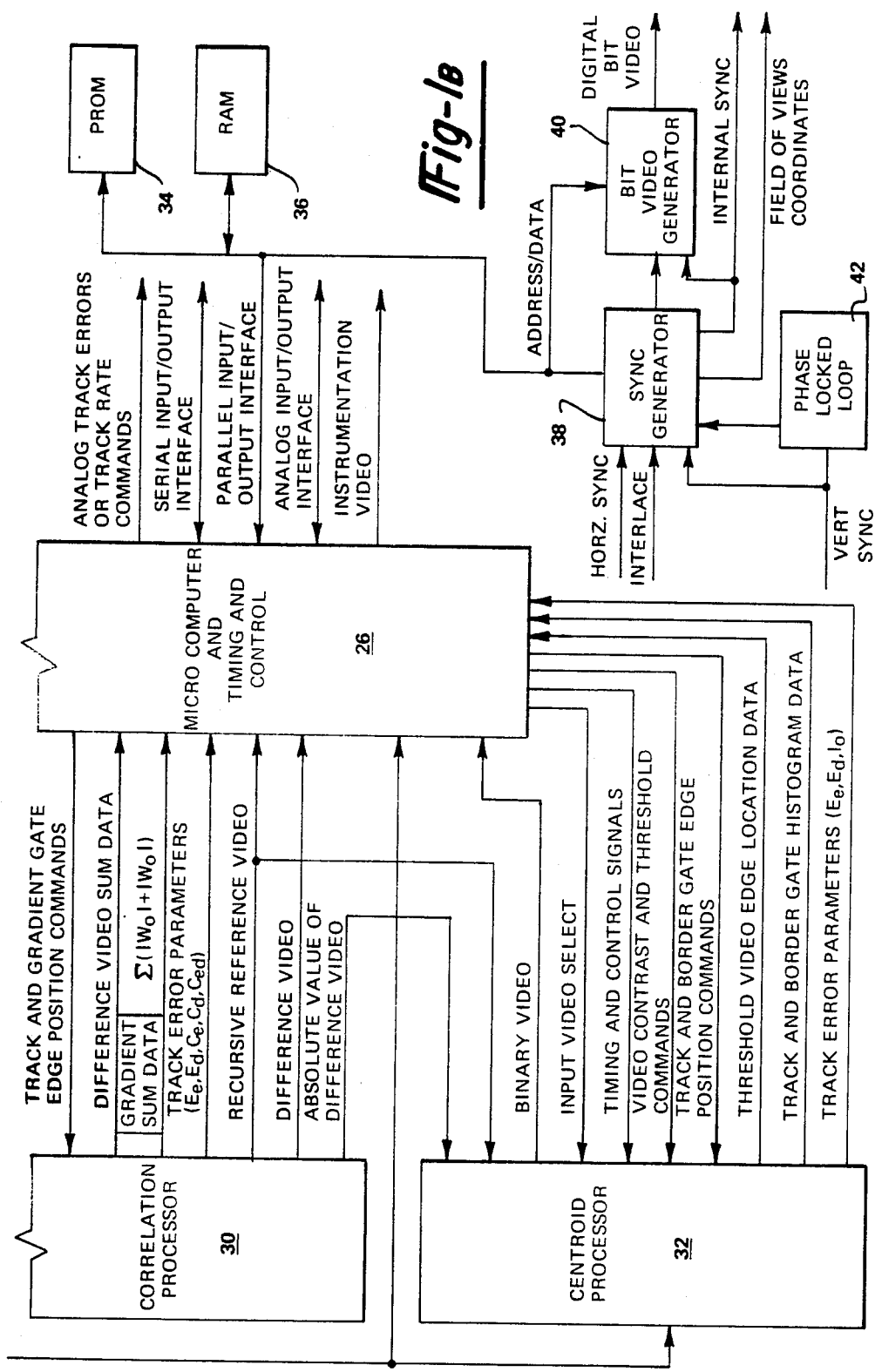

Referring first to FIGS. 1A and 1B, the present invention provides a dual mode video tracker for following and tracking a target scene 20 which is sensed by a scene signal receiver 24. The receiver 24 may comprise any of various types of sensors 22 for receiving radiated electromagnetic energy from the scene 20, thereby recording the scene 20 in a form which may be converted to electrical video signals by the receiver 24. The receiver 24 converts the recorded electromagnetic energy into analog video signals, and delivers these analog video signals along with appropriate video synchronization signals to the the dual mode video tracker which forms the present invention. The synchronization signals are not required if the analog video is a composite signal.

The video tracker broadly comprises a microcomputer and associated timing and control circuits 26, a video preprocessor 28, a correlation processor 30 and a centroid processor 32. The microcomputer 26, video preprocessor 28, correlation processor 30 and centroid processor 32 are interconnected by a later discussed, common data bus, however for purposes of the present explanation, the interconnections between these components are shown in FIGS. 1A and 1B in terms of the functional signals which are delivered between the components.

The microcomputer 26 may comprise, by way of example, an 8 MHz Intel 80186. The microcomputer 26 provides overall tracker mode control along with supervisory and computational resources for the video preprocessor 28 and the correlation and centroid processors 30, 32 respectively. Interrupt control, i.e. the recognition and priority arbitration of three interrupt signals, is provided by the interrupt controller section of the 80186 type microprocessor. The three interrupts initiate processing required at the end of centroid and correlation gates and during the end-of-field interval. The microcomputer 26 also controls a programmable sync generator 38. The sync generator 38 receives incoming horizontal and vertical sync signals from the receiver 24 to regenerate the clocks, syncs and FOV (field-of-view) coordinates used throughout the tracker. The sync generator 38 may be optionally programmed to separate the composite sync signal from the video preprocessor 28 into the vertical and horizontal sync signals when these signals are not separately provided by the receiver 24. A phase-locked loop 42 is employed to lock the incoming vertical sync signal to regenerate a pixel clock. The sync generator 38 may be optionally programmed to generate internal synchronization signals without sync signals from the receiver 24, in order to perform built-in test (BIT). The sync generator 38 also provides the master FOV coordinates for the tracker. These coordinates enable the tracker processors to correctly determine the location of a pixel within the FOV.

A BIT video generator 40 is provided to generate various types of synthetic target sizes and shapes up to 128 by 128 pixels in order to perform automatic testing of each of the processors' circuitry.

In one embodiment, the microcomputer 26 includes 128K bytes of PROM 34 (Programmable Read Only Memory) and 16K bytes of RAM 36 (Random Access Memory).

All tracker calculations or data transfers which occur at the video field rate (typically 60 Hz) or less are performed within the microcomputer 26. Some functions, such as track error calculations are appropriately executed every video field, however others are computed at the video frame rate. The video preprocessor 28 functions as a general purpose video interface having the flexibility and being configurable to accept any one of a group of video sources from various types of sensors 22 and also functions to precondition the analog video signals received from the receiver 24 to a format which is compatible with the correlation processor 30 and centroid processor 32. Further, in addition to performing basic video analog-to-digital conversion of the input video signals, the preprocessor 28 provides anti-aliasing filtering, video gain and offset actuation, gated video peak and valley detection, and configurable pixel averaging or pixel rate buffering functions.

Video Preprocessing

Referring now also to FIG. 2, wherein the fundamental components of the video preprocessor 28 are depicted, the analog input video from the receiver 24 is received as a differential signal through a microcomputer controlled switch 46 to a differential amplifier 48 which functions to minimize ground-loop noise. The switch 46 permits alternately inputting an analog BIT from the microcomputer 26 which is delivered from the microcomputer's data bus 44 and processed by a D/A converter 92. The analog video signal output from amplifier 48 is delivered through low-pass anti-alias filter 50 which also provides pseudo-averaging of pixels in the raster direction, however the filter 50 may be bypassed through a microcomputer controlled switch 52 for those configurations that require an analog-to-digital conversion that is synchronous with the input signals' multiplexing rate. A programmable offset circuit 54 and a programmable gain circuit 56 receive commands generated by the microcomputer 26 and function to adjust the offset and gain, respectively of the video analog signal. Following analog offset and gain operations, the analog video signal is encoded to seven bits by the A/D converter 60. The middle half of the seven bits is employed as a six bit video which is utilized by the correlation processor 30 and centroid processor 32, as will be later discussed.

A three position microcomputer controlled switch 58 selects either the digital signal output by the A/D converter 60, a digital BIT video source or an external digital video source for delivery to pixel averaging and rate buffering circuits 68 and 70 respectively. The digital BIT video signals are generated by the microcomputer 26 in order to perform testing evaluation based on data read from various ports in the tracker. Pixel averaging for adjacent columns or lines at 68 is performed by storing one column or line of digitized input video, then reading back the stored column or line as the next column or line arrives, and averaging the pixel pairs. Thus, alternate column or line times are used to store and to pixel-average. Averaging of adjacent pixels in a column or line is accomplished either by averaging of adjacent pixels in pairs or averaging three adjacent pixels in half-full-half weighting. The pixel averaging circuit 68 as well as the A/D converter 60 are driven by a source of input clock signals 64.

The rate buffer 70 is driven by a processor clock 66 and may consist of two columns or less of memories which alternately store the pixel-averaged column or line as it is being formed and then uses the following two column or line times to clock the data out at one-half the input clock rate. The buffer 70 effectively functions to reduce the track pixel data rate. Either or both of the pixel averaging and rate buffering operations 68, 70 may be circumvented, if desired, through a pair of microcomputer controlled bypass switches 62. By employing both pixel averaging and rate buffering, it becomes possible for the tracker to function satisfactorily with input video data rates which exceed the hardware speed limitations of the correlation and centroid processors 30, 32 respectively.

The output 94 of the video preprocessor 28 is a six-bit digital video signal which is delivered simultaneously to the correlation processor 30 and the centroid processor 32. The seven-bit output of the A/D converter 60 is employed to provide an appropriate dynamic range for video peak and valley detection using a peak detector 72 and valley detector 74. Detectors 72 and 74 are gated by an AGC signal (automatic gain control) in order to determine the maximum and minimum video intensities within the tracking gate. Each of the detectors 72, 74 includes a recursive-type filter so that at least four pixels of a given intensity are required for that full intensity to be recorded as a peak or valley. The peak and valley values are sent to the microcomputer 26 via the data bus 44 between fields, and the level and gain control calculations are then computed by the microcomputer 26. The video preprocessor 28 receives the offset and gain values from the microcomputer 26 and uses these parameters to control the DC level and video gain at 54 and 56 respectively. The DC level of the video is constant during a field but is reestablished between each video line by a suitable DC restoration circuit (not shown). Both the level and gain control loops are configured to keep the average rate of video intensities within the track gates spread over the six-bit range of digitized video used for tracking, thereby maximizing target contrast.

Thus, as described above the video preprocessor 28 functions to buffer the input video signals, converts the analog input video signal to a six-bit digital signal, automatically controls the level and gain of the digital signal and provides for both pixel averaging and rate buffering.

CENTROID PROCESSING

Figure 3:
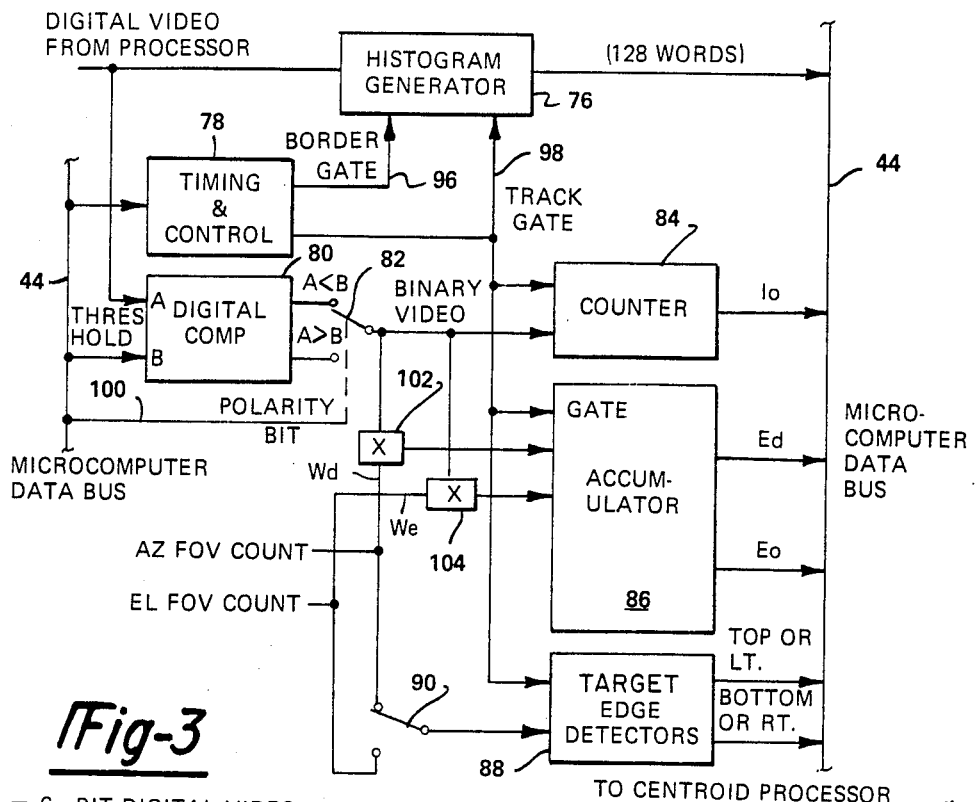
FIG. 3 is a combined block and schematic diagram of the circuit for the centroid processor.

Attention is now directed to FIG. 3 wherein the primary components of the centroid processor 32 are depicted. The centroid processor 32 functions to generate the data required by the microcomputer 26 in order to compute a centroid track error, a centroid video threshold, as well as track and border gate position and size. As shown in FIG. 3, the digital video signal from the preprocessor 28 is delivered to the input of an intensity histogram generator 76 as well as to one input of a digital comparator 80. The histogram generator 76 develops intensity histogram data for all video within the track gate 98 and also within a concentric border gate 96 area. The histogram data is employed by the microcomputer 26 to automatically compute the centroid threshold. The histogram generator 76 may comprise, by way of example, a 128×16 RAM array, in which case a 128 bit address is split into two 64-bit halves with one half at 98 being addressed by the pixel intensities in the track gate and the other half at 96 being addressed by the pixel intensities in the border gate. The RAM data is cleared between fields and is then incremented by one when addressed. The addresses 96, 98 are produced by suitable timing and control circuitry 78 which is in turn controlled by data received from the microcomputer 26 on data bus 44. The output of the histogram generator 76 consisting of two 64-word arrays corresponding to the track and border gate areas is delivered to the microcomputer data bus 44.

The six bit digital video input signal is compared by the comparator 80 to a digital threshold received on a second input from the microcomputer 26 on data bus 44, and the resulting binary video is formed for video over the threshold (positive contrast) or video under the threshold (negative contrast) according to a polarity bit 100 supplied by the microcomputer 26 to select switch 82. The binary centroid video bus formed within the track gate is delivered to a counter 84 and an accumulator 86. FOV data for both the azimuth (AZ) and elevation (EL) supplied by the microcomputer 26 are delivered to the accumulator 86 as well as to a target edge detector 88; the target edge detector 88 receives these FOV counts on a time shared, basis from switch 90 which toggles at the video field rate. The target edge detector 88 thus detects the elevation (top and bottom) and azimuth (left and right) FOV locations corresponding to the thresholded target edges, and this target-edge information is output to the data bus 44 and is used by the microcomputer 26 to determine the sizes of the track and border gates.

As previously noted, track gate size control is achieved by detecting and processing the location of threshold video edges. As shown, in the diagram of FIG. 4, the binary video output from the digital comparator 80 is effectively multiplied by linear weighting functions, $W_e$ and $W_d$, which are determined by track gate size and position information. The linear weighting functions $W_e$ and $W_d$ may be derived from pixel counters (not shown) in the video line or column direction and line or column counters (not shown) in the orthogonal direction. Thus, the binary video-weighting function products and the number of pixels passing the threshold are accumulated over the track gate. As shown in FIG. 3, the binary output of the comparator 80 is multiplied or gated by multipliers 102 and 104 in accordance with the linear weighting functions $W_e$ and $W_d$ before delivery to the accumulator 86.

The track gate enables the accumulation of three binary centroid video variables, $E_e$, $E_d$ and $I_o$ which are the raw error parameters that are delivered to the microcomputer 26 via data bus 44 after the track gate has scanned each field. The actual track errors are then computed at the video field rate by the microcomputer 26 using the centroid video variable values from two consecutive video fields. The variables $E_e$, $E_d$ and $I_o$ represent the accumulation of the elevation and azimuth FOV positions and pixel count respectively of active centroid video within the track gate.

It should be noted here that the border gate is concentric with the track gate, and the size relative to the track gate can be adjusted through appropriate software control. Furthermore, the centroid processor 32 may receive as its input, a recursive reference (later described as a "last map") or difference video signals from the correlation processor 30.

Correlation Processing

The correlation processor 30 (FIGS. 1A and 1B) essentially incorporates the fundamental components and the technique of generating correlation tracking error signals employed in U.S. Pat. No. 4,133,004 issued Jan. 2, 1979 to John M. Fitts, the entire disclosure of which is incorporated by reference herein. In addition to generating correlation tracking error signals, the correlation processor 30 accumulates a sum of the absolute values of the weighting functions $W_d$ and $W_e$, and the sum of the difference video which will be defined hereinafter. The sum of the difference video is accumulated over the track gate area and the absolute value of the weighting function is accumulated over a gate area independent of the track gate and is then employed by the microcomputer 26 to calculate the correlation track gate size.

The azimuth weighting function $W_d$ and elevation weighting function $W_e$ are respectively defined by the following relationships:

$$Wd_{i,j}(k) = \frac{-MAP_{i,j+1}(k-1) + MAP_{i,j-1}(k-1)}{2\Delta d}$$

$$We_{i,j}(k) = \frac{-MAP_{i+1,j}(k-1)(k-1) + MAP_{i-1,j}(k-1)}{2\Delta e}$$

where $\Delta e$ is the dimension of each pixel along the $\epsilon$ coordinate, and $\Delta d$ is the dimension of each pixel along the $\eta$ coordinate, and i and j respectively represent a pixel location along the $\epsilon$ and $\eta$ coordinates.

The technique disclosed in U.S. Pat. No. 4,133,004, hereinafter referred to as a matched filter correlation technique allows the use of "pipeline" processing of the video data. Using pipeline processing, all of the stored reference scene and the current scene information within a track gate is utilized as the gate is scanned, thus yielding error signal data immediately after the track gate scan is complete, regardless of the size of the gate.

As will be discussed below in more detail, the correlation processor 30 also employs a recursive reference update method wherein new video data is incrementally added to previously existing reference video data, such that the reference data is updated smoothly; in this manner, changing target features (due to attitude or range changes and sensor roll about the line-of-sight) are accepted, but more rapidly changing data, such as noise and clutter which pass through the scenes are rejected.

Figure 5:
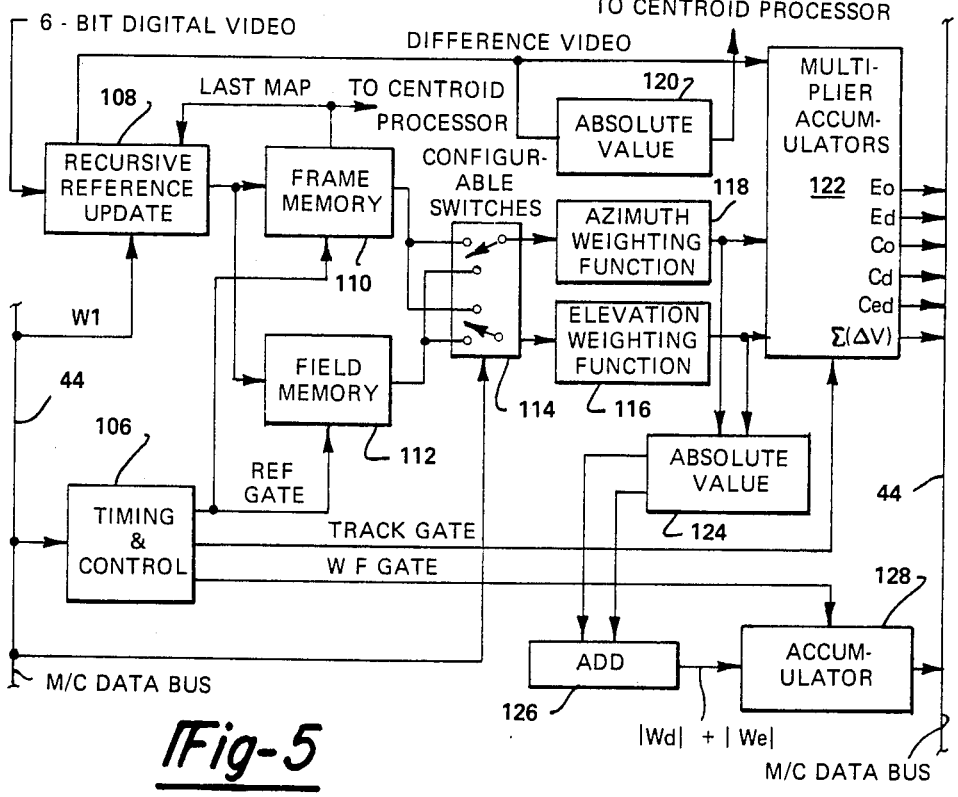
FIG. 5 is a combined block and schematic diagram of the circuit for the correlation processor.

Attention is now directed to FIG. 5, wherein the basic components of the correlation processor 30 are depicted. The six bit digital video data delivered from the video preprocessor 28 is received by a digital recursive reference circuit 108 together with a memory 110 for storing a correlation reference having an area of N by M track pixels per field. The input video from the video preprocessor 28 updates the recursive reference with a time constant, $W_1$, which is controlled by the microcomputer 26. Reference updating is accomplished on a pixel-by-pixel basis in real time by subtracting the last reference pixel video intensity value from the input video intensity value, thereby producing a "difference video", $\Delta V_{ij}(k)$, shifting the difference video in accordance with the $W_1$ parameter and then adding the shifted difference video to the last reference video intensity. The results of this recursive reference computation is a "present map" and is stored in the frame memory 110 to become the "last map" for the next frame. This technique is described by the equation:

$$MAP_{ij}(k) = W_1 V_{ij}(k) + (1 - W_1) MAP_{ij}(k-1)$$

where, $MAP_{ij}(k)$ = present map (recursive reference output)
$V_{ij}(k)$ = input video
$MAP_{ij}(k-1)$ = map video (from previous frame)
$W_1$ = filter time constant The results of the recursive reference computation are delivered to frame and field memories 110, 112 respectively for storage therein. A timing and control circuit 106 controlled by the microcomputer 26 outputs reference gate signals in order to clock out the reference video from memories 110, 112 through configurable switches 114 to elevation and azimuth weighting function circuits 116, 118 respectively. The reference video is also fed back as the "last map" to the recursive reference 108 and is also delivered to the input of the centroid processor 32 for use in the complementary and low SNR tracker operating modes. Separate frame and field memories 110, 112 are required to accommodate differing video source formats. Similarly, the configurable switches 114, which are under control of the microcomputer 26 are also provided to accommodate different video source formats. In the case of some video formats, the weighting function in the interlace direction, for example, is derived from video with one frame delay, while other formats require one field delay. As shown in FIG. 6 which spatially represents pixels used in computing the correlation weighting functions for a pixel "X", the azimuth weighting function $W_d$ is a function of pixels A and B forming part of a scan line 132, while the elevation weighting function $W_e$ is a function of pixels C and D which occur during the same pixel clock period 130, but are on scan lines on either side of the one containing pixel "X".

The difference video is delivered from the recursive reference update function 108 to a set of multiplier-accumulators collectivey indicated at 122 and to a circuit 120 which calculates the absolute value of the difference video and forwards such value to the centroid processor (FIG. 1B) for use in the "difference video" or automatic target detection tracking mode.

The correlation weighting functions $W_d$ and $W_e$ respectively output from the weighting function circuits 118 and 116 are delivered to a circuit 124 where their absolute values are computed. The absolute values of the weighting functions are then summed together by an adding circuit 126 and this sum is accumulated over an independently controlled gate area by an accumulator 128. The accumulated sum, or gradient function, is output to the data bus 44 and is employed by the microcomputer 26 to automatically size the tracking gate.

The difference video is accumulated at 122 for each pixel in the track gate. This accumulated sum is output to the data bus 44 and is employed by the microcomputer 26 to determine the correlation track quality.

A timing and control circuit 106 operated by the microcomputer 26 provides the necessary timing and control signals for the correlation processor 30. Specifically, circuit 106 provides reference gating signals to memories 110, 112, a track gate signal to the multiplier-accumulators 122 and a weighting function gate signal to the accumulator 128.

As indicated previously, the correlation elevation weighting function $W_e$ is the difference between the intensity values for the pixels above and below the present pixel being processed. Likewise, the azimuth weighting function $W_d$ is the difference between the pixel intensity values to the left and right of the present pixel being processed. In the event that the video format is interlaced in the $W_e$ direction, the $W_e$ function requires information in the field opposite from the field being processed; this information is supplied by the field memory 112. The $W_d$ function requires information in the same field as the field processed, so that data is available from the frame memory 110 used by the recursive reference 108.

The multiplier-accumulators 122 are operative to accumulate data only within the track gate area and form the following five correlation variables which are employed by the microcomputer 26 to compute to the correlation track error:

$$E_e(k) = \Sigma[We_{ij}(k) \cdot \Delta V_{ij}(k)]$$

$$E_d(k) = \Sigma[Wd_{ij}(k) \cdot \Delta V_{ij}(k)]$$

$$C_e = \Sigma[We_{ij}(k)]^2$$

$$C_d = \Sigma[We_{ij}(k)]^2$$

$$C_{ed} = \Sigma[We_{ij}(k) \cdot Wd_{ij}(k)]$$

Using the above five variables, the microcomputer 26 computes the track errors according to the expression:

$$\delta'_d = \left[ E_d - E_e \left( \frac{C_{ed}}{C_e} \right) \right] \left[ \frac{2}{C_d \left( 1 - \frac{C_{ed2}}{C_e C_d} \right)} \right]$$

$$\delta'_e = \left[ E_e - E_d \left( \frac{C_{ed}}{C_d} \right) \right] \left[ \frac{2}{C_e \left( 1 - \frac{C_{ed2}}{C_e C_d} \right)} \right]$$

Figure 8:
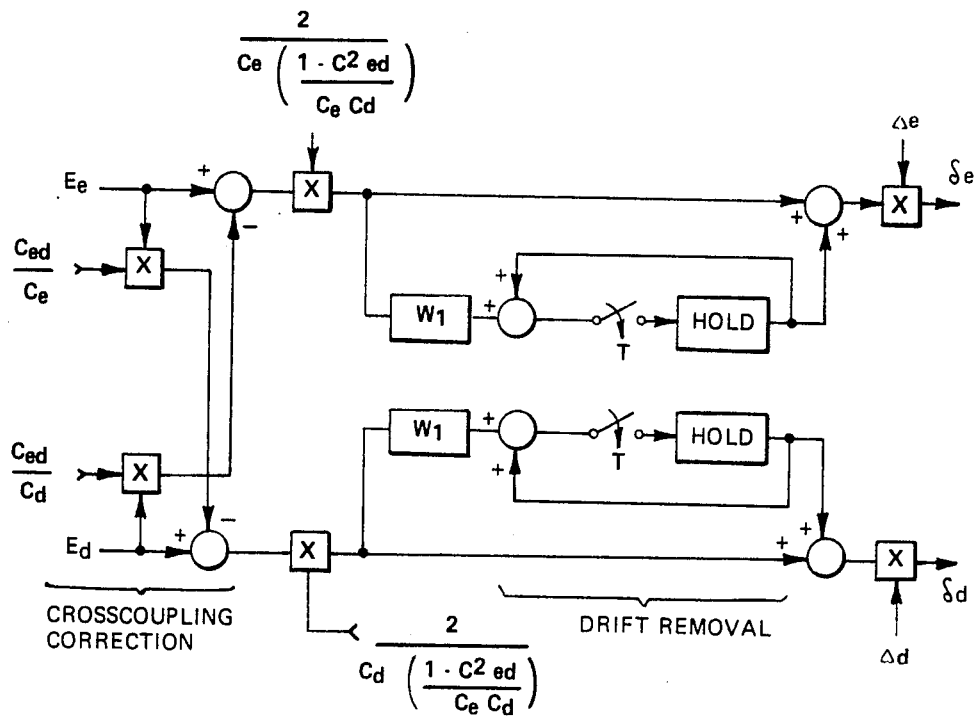
FIG. 8 is a block diagram showing the relationships for calculating the correlation error.
Figure 9:
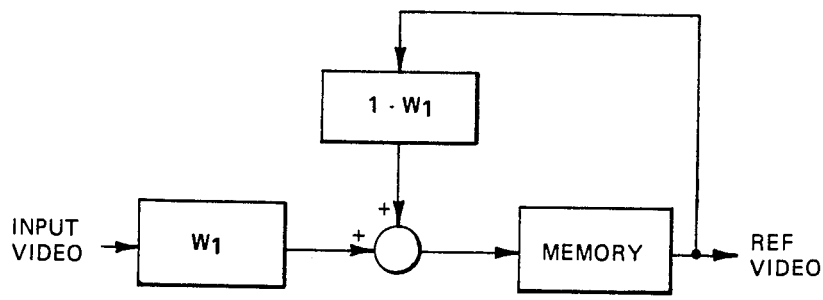
FIG. 9 is a broad block diagram of the correlation recursive reference.

The matched filter correlation processing technique mentioned above will now be described in more detail with reference to FIGS. 7-9. The technique can be viewed as a method for determining the location of the zero crossing of the cross correlation function spatial derivative, which is mathematically equivalent to determining the peak of the scene-reference cross-correlation function. Employing a Taylor Series expansion, it can be shown that the zero crossing can be computed by multiplying the pixel intensity differences between the incoming scene and the reference scene by weighting functions that are the horizontal and vertical spatial derivatives of the reference scene at the location of the reference scene pixel being processed. The individual difference video-weighting function products for each pixel are generated as the incoming scene is scanned and are accumulated over the track gate of interest. Tracking errors are then obtained by appropriately scaling these accumulated products by the accumulated sums of the products and squares of the weighting functions. Weighting function generation and the appropriate pixel rate multiplications, along with the product accumulations, are performed by the correlation processor 30.

Figure 7:
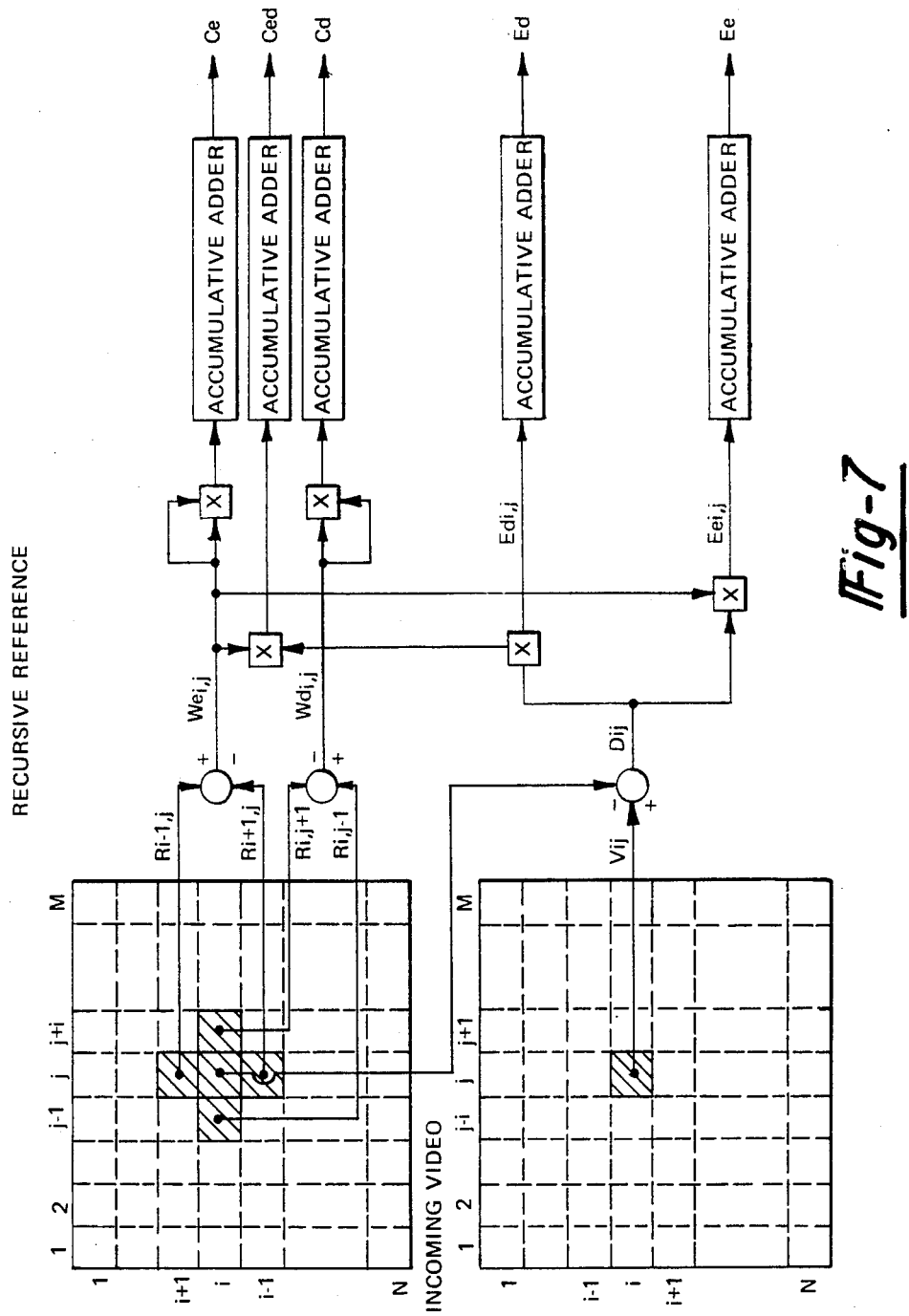
FIG. 7 is a combined block and diagrammatic view of a circuit utilizing pipeline processing technique of the correlation processor.

FIG. 7 depicts the pipeline processing of the incoming video and recursive reference employed by the correlation processor 30 for a simplified, non-interlaced video format. The horizontal and vertical weighting functions are designated as $W_{dij}$ and $W_{eij}$, respectively. The difference video is equal to $V_{ij} - R_{ij}$, where $V_{ij}$ and $R_{ij}$ are the incoming scene and the reference pixel intensity values, respectively. The remaining portion of the track error computation is executed by the microcomputer 26 after the track gate is scanned and the error parameter accumulated sums are available. This computation consists of scaling a cross-coupling correction and drift-removal processing. These latter mentioned computations are depicted in block diagram form in FIG. 8. The scaling computation consists of normalizing the raw track errors, $E_e$ and $E_d$ by the appropriate squared weighting function sum. The cross-coupling correction operation utilizes the weighting function cross-product sum, $C_{ed}$, and removes error cross-coupling that otherwise occurs in many correlation processing algorithms when scene or target edges or intensity gradients are skewed relative to the horizontal and vertical axes.

Drift removal processing compensates for the fact that the recursive reference is continuously updating with an update rate factor $W_1$. The fundamental components of the recursive reference 108 along with frame memory 110 are shown in FIG. 9. As previously indicated, the recursive correlation reference is generated by multiplying the input video pixel intensity values by a weighting factor, $W_1$, and adding it to the existing intensity value for the corresponding reference pixel after the reference value has been multiplied by $1-W_1$. The "lifetime" of the particular scene in the reference is determined by the value of $W_1$ (which is equal to or less than 1). If $W_1$ equals 1/60th for example, and the sensor field rate is 60 fields per second, the "lifetime" of a reference scene is one second. For drift removal processing, the past tracking errors are accumulated with a weighting factor of $W_1$, thus ensuring that the initial pointing reference is maintained even if dynamic following errors occur during reference update. Furthermore, with drift-removal processing of dynamic following errors, many pixels in magnitude can exist without causing loss of lock even though in some circumstances the basic error processing algorithm provides error signals with limited dynamic range. The outputs of the drift removal processing are then scaled by the track video pixel sizes to yield angular tracking errors.

For interlaced video formats, recursive references are effectively generated for each individual field. For sensors with a 2:1 non-overlapping interlace, the weighting functions in the interlace direction are generated using intensity values from adjacent pixels in the reference for the opposite field. The accumulated sums for the non-overlapping interlaced fields are then combined and utilized for a single track error computation that is updated each time new data is obtained from a field. With interlaced video formats, the $W_1$ update rate factor is the recursive reference update rate factor divided by the number of video fields per video frame.

The recursive update rate factor $W_1$, which may be between zero and one is dynamically controlled by the microcomputer 26. A factor 1 which corresponds to a single frame memory is used to load a new reference. A factor of 0 is employed to freeze the reference when the transient clutter is detected, thus preventing clutter contamination. During the tracking engagement, a reference is loaded when tracking is initiated. The update rate factor is then decreased to successively smaller values in a programmed manner so as to optimize the noise filtering property of the recursive reference. Thereafter, the update rate factor is a function of the correlation track status and the frame-to-frame errors between the incoming scene and the reference. If the frame-to-frame error increases, the update rate factor is also increased, thus reducing the instantaneous misalignment between the incoming scene and the reference. When clutter intrusion is detected the reference is frozen.

Scene or target video gradients contain the information fundamental to correlation tracking. Thus, it is desirable to size the correlation gates so as to maximize this information content. In order to generate an appropriate measure of the desired information, the gradient function is generated for each reference pixel contained in the track gate. As previously mentioned, this gradient function is the sum of the absolute values of the horizontal and vertical weighting functions for the pixel location of interest. The gradient function is then accumulated over a gradient gate, and the gradient gate size is dithered by the microcomputer 26 so as to maximize the average value of this sum over the gradient gate. The gradient-gate edge locations are then processed by the microcomputer 26 to generate the desired track-gate edge locations.

Under normal tracking conditions, the sum of the difference video over the track gate is relatively small. However, in the event that clutter intrudes into the track gate, it gives rise to a significant difference video sum. Thus, the difference video is accumulated over the track gate and this clutter detection information is sent to the microcomputer 26 for use in various correlation tracking control algorithms and in overall tracking processor mode and track state control.

Scene-averaged video from the correlation recursive reference and the correlation difference video are intrinsic to the matched filter correlation technique. When the video output byproducts are combined with the function provided by the centroid processor 32, the result provides a means to implement a number of useful tracking functions in operating modes under control of the microcomputer 26.

Another significant feature of the present tracker is the manner in which a track status indication, TSI, is generated using the correlation processor 30, and in this regard reference is now made to FIG. 5 wherein the fundamental components of the correlation processor 30 are depicted along with the components for generating TSI. The weighting functions $W_d$ and $W_e$ derived from the recursive reference 108 and map 110 are processed by the multiplier accumulators 122 to produce the error scaling functions $C_d$, $C_{ed}$, and $C_e$. Additionally, the weighting functions $W_d$ and $W_e$ are multiplied by the difference video and accumulated at 122 to produce error functions $E_e$ and $E_d$. The difference video produced by subtracting the last map from the input video at 108 is also accumulated at 122. The absolute values of the weighting functions $W_d$ and $W_e$ are calculated at 124; these absolute values are summed at 126 and accumulated at 128.

Track status indication (TSI) for correlation processing is determined by the following functions:

(1) $|\Sigma\Delta V|/A_{tg}$
(2) $\Sigma|W_e| + |W_d|$ $$\frac{\Sigma|W_e| + |W_d|}{A_{gg}} \quad (3)$$

where, $A_{tg}$ = track gate area, and
$A_{gg}$ = gradient gate area

In order to achieve a "satisfactory" TSI, function (1) above must be lower than a lower limit value and functions (2) and (3) must be both greater than predetermined values; if either of the functions (2) or (3) fall below the respective predetermined values, the TSI becomes "impending loss of lock", regardless of the magnitude of function (1). If the magnitude of function (1) is greater than the lower limit but less than an upper limit value, then the TSI is "marginal". If function (1) exceeds the upper limit value, the TSI changes to "impending loss of lock".

From the foregoing description, it is believed that those skilled in the art will readily envision various circuits for implementing the correlation processor 30. However, for the sake of providing a full and complete description herein, one specific implementation of the correlation processor 30 will now be described with reference to FIGS. 10 and 11. The update rate factor $W_1$ is delivered from the data bus 44 as a 4 bit word to a latch 138 which is selectively enabled by a $W_1$ write enable signal. One bit of $W_1$ in latch 138 is delivered to map freeze logic 142 which functions to freeze the recursive reference when clutter intrusion is detected. In response to transient clutter, a freeze signal and an accumulator inhibit signal are output from the map freeze logic 142 in order to freeze a later discussed map filter 154 and inhibit the accumulators 122, 128 (FIG. 5).

Six bits of digital video data from the video preprocessor 28 are delivered to a subtraction circuit 144 which functions to subtract from the video data a value corresponding to a threshold value which is supplied by the microcomputer 26 and is then stored in a correlation threshold latch 140. The output of the subtraction circuit 144 is delivered through a multiplexing latch 146 as a 6 bit word to a second subtraction circuit 148 which functions to subtract the "last map" video data from the incoming video. The resulting output of the subtraction circuit 148 is a 13 bit word which is held by latches 152 and is then delivered to a map filter 154 that is controlled by the time constant signal $W_1$ and an associated freeze signals supplied by the latch 138 and logic circuit 142 respectively. The output of the map filter 154 is delivered to an adder circuit 156 and is summed with the "last map" held in a pair of latches 150.

Figure 11:
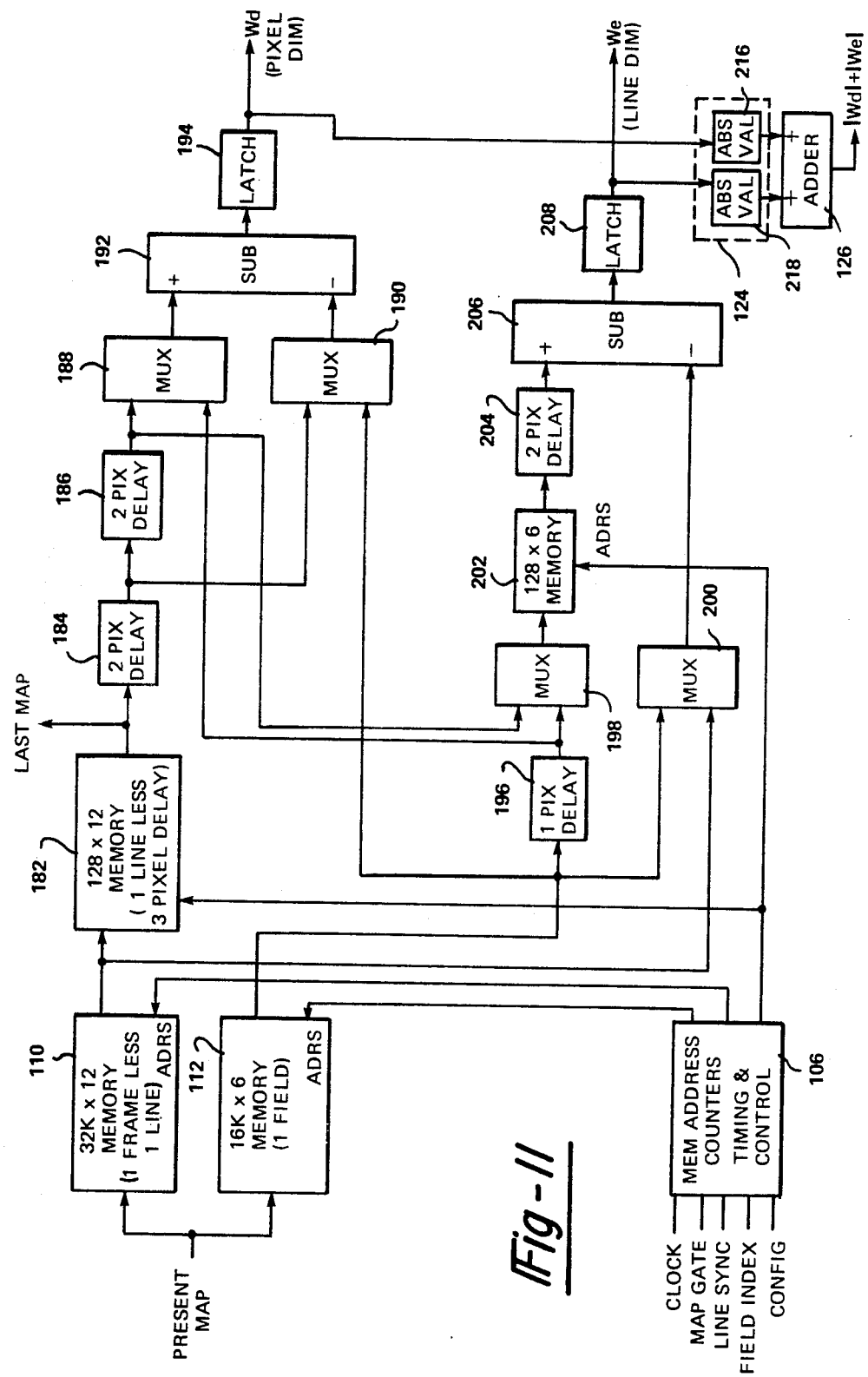

The output of adder 156 is a 12 bit word corresponding to the "present map" which is latched at 158 and is subsequently written into memories 110, 112 (FIG. 11).

The output of the subtraction circuit 148 is the difference video which is rounded from 8 to 7 bits at 164 and is then held in latches 166, 168 for subsequent delivery to a multiplexer 160 and to the multiplier-accumulator 122 (FIG. 5). The multiplexer 160, under control of an instrument video select signal, selectively delivers the difference video or the last map through a driver 162 to an instrument video bus 226. Data on the instrument video bus 226 may be employed by additional circuitry (not shown) forming part of the tracker for forming symbols such as a rectangle, cursor, etc. to aid the operator in aiming and tracking.

The absolute value calculating circuit 120 includes a suitable circuit 170 for computing the difference video output from the subtracting circuit 148 into an absolute value, along with a latch 172, and a bus driver 176. The output of the bus driver 176 is delivered via bus 240 for carrying the absolute value of the difference video.

Figure 10:
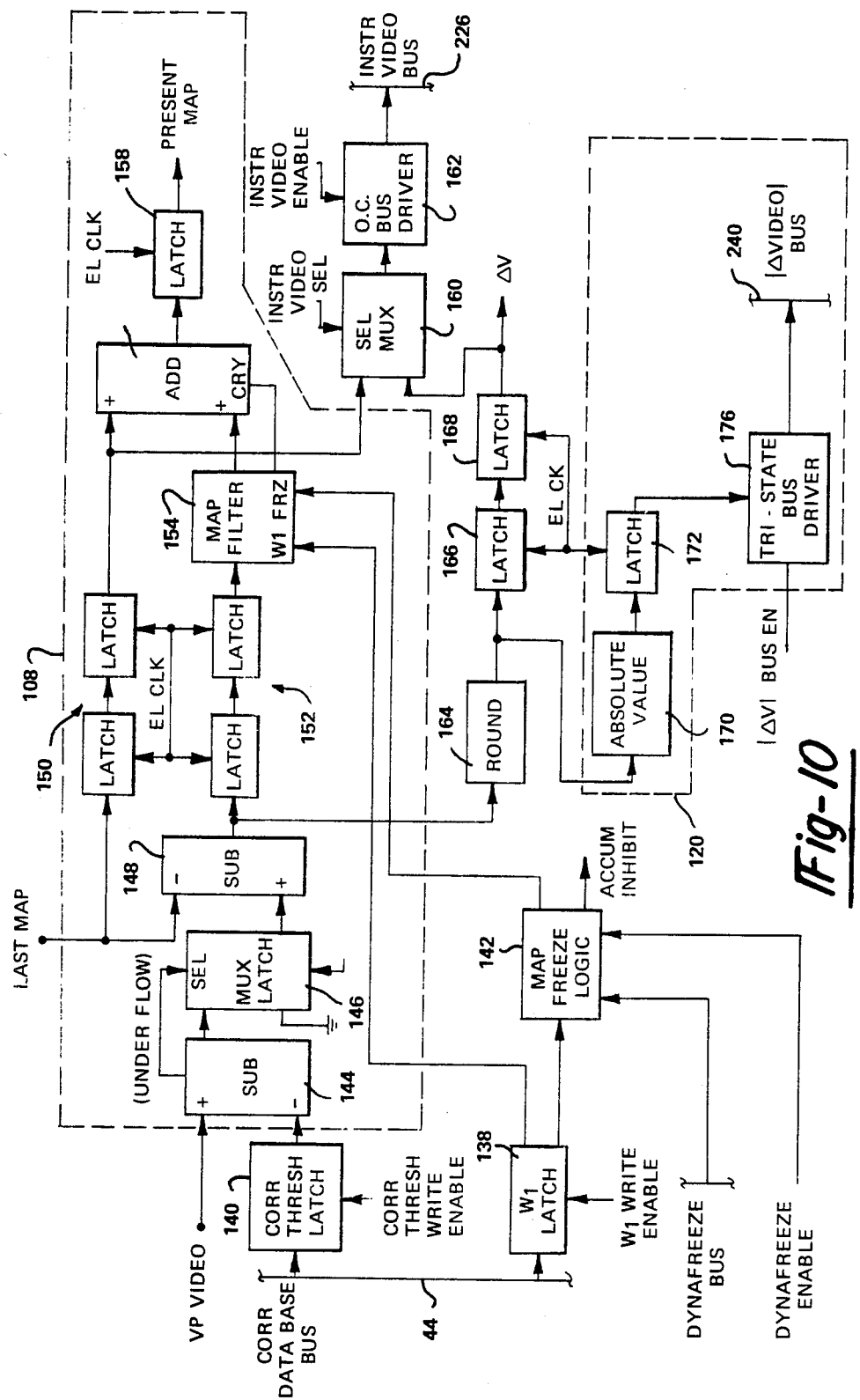
FIGS. 10 and 11 are detailed block diagrams of the circuit for the correlation processor depicted in FIG. 5.

Referring now particularly to FIG. 11, as previously indicated, the present map is a 12 bit word which is written into memories 110, 112. Memories 110, 112 are addressed by memory addresses supplied by a map clock gate and memory address counters which form a portion of the timing and control circuit 106. Data read from the frame memory 110 is loaded into a line memory 182, and is also delivered to the input of a later discussed multiplexer 200. The line data is read from memory 182 using address signals from the timing and control circuit 106, and is then delivered as the "last map" to the recursive reference update (FIGS. 5 and 10). The last map is also delivered to a multiplexer 188 after being delayed by a pair of two pixel delays 184, 186, each of which may consist of two latches. A second input to the multiplexer 188 is formed by data read from the field memory 112 which has been delayed by one pixel at 196.

Data read from the field memory 112 is also delivered to a multiplexer 190 along with data read from the line memory 182 which has been delayed two pixels at 184. The multiplexed data from multiplexer 190 is subtracted by a subtraction circuit 192 from the multiplexed data from multiplexer 188 in order to calculate the azimuth weighting function $W_d$. The weighting function data $W_d$ is latched at 194 and is then delivered to the multiplier-accumulator 122 as well as to the absolute value circuit 124.

The data read from the field memory 112 is delivered to a multiplexer 198 after being delayed by one pixel at 196, and is also read directly to another multiplexer 200. The data read from field memory 112 is multiplexed at 200 along with the data read from memory 110. Data is read from the memory 202 using addresses supplied by the timing and control circuit 106. The data read from memory 202 is delayed two pixels at 204 and is supplied to a subtraction circuit 206.

The data read from the frame and field memories 110, 112 respectively is also delivered to the subtraction circuit 206 via a multiplexer 200, and this data is subtracted from the data read from the line memory 202 in order to calculate the elevation weighting function $W_e$. The weighting function data $W_e$ is latched at 208 and is delivered to both the multiplier-accumulator 122 and the circuit 124 which in turn comprises a pair of conventional circuits 216, 218 for respectively receiving and calculating the absolute values of the weighting functions $W_d$ and $W_e$.

An adder circuit 126 combines the absolute values of the weighting functions, and delivers the sum to accumulators 128.

Tracking Modes

The video tracker is controlled by the microprocessor 26 to operate in a variety of tracking modes or arrangements. These modes range from a fully automatic operation which incorporates both the correlation and centroid processors 30, 32 operating in conjunction with each other, to complete manual control of either or both of the processors 30, 32, including manual control of the various ancillary functions, such as gate sizing, video threshold selection and recursive reference update rate selection.

Deriving meaningful track status indications for both the centroid and correlation processors 30, 32 is important in implementing effective automatic track mode control. The track status for each of the processors 30, 32 is classified as either satisfactory, marginal or impending loss of lock. In tactical applications, clutter interference rather than simple relative target motion is usually the cause of track loss. Consequently, a key element in establishing track status is the detection of clutter interference. The sum of the difference video for the correlation processor 30 and the combination of track and border gate intensity histogram data for the centroid processor 32 provide effective indications that clutter interference is occurring. These clutter interference indications, coupled with the magnitude of the correlation gradient data for the correlation processor 30, and the number of pixels passing threshold for the centroid processor 32 are used to establish the track status. If clutter interference is not indicated and the other track status parameter values exceed a specified minimum value, the track status is classified as satisfactory. If clutter interference is indicated and the other track status parameter values still exceed the specified minimum value, the track status is classified as marginal. If either the clutter interference indication exceeds a specified threshold value or the other track status parameters fail the minimum value criteria, the track status is classified as impending loss of lock.

These track status indicators for the correlation and centroid processors 30, 32 are employed in various elements of the mode control for the individual processors and the overall tracking system. For example, if the correlation track status falls below satisfactory, the recursive reference is frozen to prevent clutter from entering the reference and the preserve the proper reference scene for reacquisition when the interference clutter passes. If centroid track status falls to marginal, the centroid gate sizing algorithm is modified so as to attempt to achieve a balance between track gate area and the number of "target" pixels passing the threshold. If the centroid track status falls to impending loss of lock, the gate size, contrast selection and the threshold value are frozen to aid proper reacquisition when the interfering clutter passes.

The video tracker may be operated in a dedicated centroid mode in which the centroid processor 32 is solely utilized to derive tracking rate commands. Acquisition in this mode is initiated with the processing track gates centered about the indicated bore sight location. In each successive video frame, threshold and target contrast computations are executed to determine if a threshold value can be found for either positive or negative contrast targets such that the video passing the computed threshold will yield pixels corresponding with only track gate histogram intensity values and no pixels only with border gate histogram intensity values (i.e., a satisfactory track status). If a suitable threshold value cannot be found, the gate sizes are increased by a preselected factor, e.g. 40%, for the next video frame. When a suitable threshold value is found, a check is executed to determine if the indicated target centroid location is within an easily programmable specified number of pixels from the bore sight position. This check is executed to prevent locking on to clutter objects rather than the target of interest. If the candidate target fails this test, growth rate by the preselected factor is continued. Otherwise, a target contrast-select flag is set (i.e., the target contrast is specified), and in-raster tracking is initiated.

During dedicated centroid tracking, the video threshold values (given the selected target contrast), the track gate sizes and the track status indication are continuously updated. As previously mentioned, the centroid track status indication is employed for overall control of the centroid processor 32. If the track status falls to marginal, a relatively moderate amount of background clutter is expected to pass the video threshold value and the gate size control algorithm is modified to minimize tracking interactions. If the track status falls to impending loss of lock, the clutter interference is more severe or the target is not distinguishable, and a coast-state is initiated.

The video tracker may also be operated in a dedicated correlation mode in which the correlation processor 30 is solely utilized to derive tracking rate commands. In this operating mode, the tracker can be operated as a scene or a particular target tracker. Although it is possible to perform this function with correlation processing gates of a fixed size, it is desirable to size the track gate so as to maximize the target video gradients which contain the information that is fundamental to correlation tracking. This is true for both target and scene tracking. In other words, if a significant portion of a fixed-size scene correlation gate encompasses bland features, the resulting tracking performance is degraded rather than improved by processing this portion of the video scene. Consequently, it is preferable to employ automatic correlation gate sizing in the correlation track mode to achieve maximum efficiency. If it is desired to track scenes rather than targets, a larger initial gate size may be used to initially encompass a reasonable portion of the field of view of the sensor 22. The initial gate size in the scene track mode should be selected to contain a reasonable amount of scene intensity gradient information, however if the situation improves with a larger gate size, the larger size will automatically be found during the acquisition process.

Acquisition in the correlation track mode is initiated with the processing gates for each field being centered about the indicated bore sight location. When the acquisition process is first initiated, the current scene is loaded into the recursive reference. The recursive reference update rate is then programmed to decrease from $W_1 = \frac{1}{2}$ so that the noise filtering properties are optimized. After two frames, $W_1$ is less than $\frac{1}{2}$ and for each frame thereafter the gate size is increased in incremental steps, e.g. 25% in each dimension until a maximum size is reached or the average value of the gradient function over the track gates decreases. When the gate size is established, in-raster tracking is initiated. For the correlation processor 30, in-raster tracking is implemented by repositioning the track gates and the recursive reference within the video raster so as to null the correlation track error. Track status is then computed for each video frame, and when the status is satisfactory for two consecutive frames a track-valid flag is set, in-raster track is terminated and active tracking is initiated. If a valid track is not obtained after 16 frames of in-raster tracking, the recursive reference is reloaded and the acquisition process is reinitiated.

During correlation tracking, the gate sizes are updated by continuously dithering the individual gradient gate edges in sequence so as to maximize the average value of the gradient function over the gradient gate. The track gate is then sized so that an N pixel margin is provided between the track gate edges and the gradient gate edge locations that produce a maximum for the average value of the gradient function.

While in the correlation track mode, the correlation track status indication is employed for overall control of the correlation processor 30. If track status falls to marginal, moderate clutter interference is occurring and, although the tracking performance is not expected to be significantly degraded, the recursive reference is frozen to prevent the clutter from entering the reference.

If the track falls to impending loss of lock, the clutter interference is more severe and a coast state is entered. During the coast state, the track gate sizes and the recursive references are frozen. Execution of the coast state is similar to that described above with reference to the centroid track mode. If the track status improves to better than impending loss of lock during the coast interval, the active track state is automatically reinitiated. Otherwise, the correlation track acquisition process is reinitiated.

The correlation-track status indicator is an accurate measure of the quality of the "match" relative to the reference image. There are two significant aspects to this indication. First, the average value of the sum of the difference video over the track gate is a direct measure of the difference between the incoming scene and the reference. Second, both magnitude and the average value of the gradient function over track gate are measures of the tracking information content of the reference. If this information content becomes too small, poor tracking performance can be expected and a measure of the scene-reference match is meaningless. Thus, the full track status indicator serves as the match quality output.

Finally, the video tracker is also capable of operating in an automatic or "competitive" track mode. In the automatic mode, the correlation processor 30 and centroid processors 32 operate in conjunction with each other, and the processor yielding the "best" performance is selected for active track control. The mode control for both processors 30, 32 in the automatic track mode is similar to that described above for the dedicated centroid track and dedicated correlation track modes. Since it is essential to isolate the moving target from the background in the automatic track mode, the initial correlation track gate size is identical to that used for the centroid processor 32 in the dedicated centroid track mode.

There are three track states in the operating track mode: track initiate, track maintenance and track coast. In a manner similar to that employed for the dedicated track modes, the track-state control transitions are determined by the track status indication derived for the two processors 30, 32. A track-valid indication is generated at the time a satisfactory track status is first established after the acquisition sequence is initiated for each processor 30, 32. This processor is then a candidate for active tracking control. The processor with the highest track status is selected for active tracking control and in the event that the track status is equal for both processors 30, 32 when the track-valid indications are first obtained in the track intiate state, control goes to the centroid processor 32 if the centroid gate area is less than a preselected number of square pixels. Upon entry to the track maintenance state, track status "ties" go to the correlation processor 30 if the correlation gate area is larger than a preselected number of square pixels.

The track initiate state is designated when track is first initiated via a track-initiate command or is subsequent reacquisition command for one of the processors cause only one processor to yield a track-valid indication. Transition from the track initiate state to the track maintenance state occurs shortly after both processors 30, 32 yield a track-valid indication and at least one of the processors has a track status indication that is better than impending loss of lock. If only one processor has a track-valid indication and its track status indicator falls to impending loss of lock, the track initiate state is exited to the coast state.

As previously mentioned, the processor with the highest track status is selected to provide active tracking commands. The inactive processor is then operated in an in-raster track mode, where the track gate is continuously positioned in the video raster so as to null the indicated track error. When this situation occurs, a check is continuously executed to determine if the center of the centroid track gate falls within the correlation track gate. If it does not, it is assumed that the inactive gate is not tracking the proper target, and the track-valid indication for the inactive processor is negated. The track gate center for this processor is then repositioned so as to coincide with the center of the gate for the active processor, and the reacquisition process is initiated for the inactive processor.

The track maintenance state is exited to the coast state if the track status for both the correlation and centroid processors 30, 32 fall to impending loss of lock. The track maintenance state is exited to the track initiate state if the inactive processor is forced into the reacquisition process. Execution of the coast state is similar to that described for the centroid-track mode.

Automatic Target Detection

The present video tracker may be operated in a "difference video" mode in which the tracker detects and automatically acquires a target moving relative to the scene or background. As previously discussed, the absolute value of the difference video output from the correlation processor 30 is available as a by product of the correlation processing function and this video output may be delivered to the centroid processor 32. If the correlation processor 30 is employed to track a stationary scene, a target moving relative to this scene will show up in the difference video. Thus, moving targets are detected and automatically acquired by processing this video output with the centroid processor 32 while the correlation processor 30 is tracking a stationary scene. In this event, a moving target is detected in the difference video when the magnitude of the absolute value of the difference video exceeds a nominal threshold value. In-raster tracking is then initiated with the centroid processor 32 and the portion of the field of view contained within the centroid track gate is excluded from correlation processing. Immediately following centroid in-raster track initiation, target tracking rates are computed from the centroid gate position changes in the field-of-view.

Once tracking rate estimates are obtained, background and difference video tracking are terminated and the correlation track gate size is sized and positioned to be consistent with the centroid gate. The tracking system is then commanded to move at the estimated line-of-sight rates, and tracking is initiated in one of the dedicated target tracking configurations.

Low SNR Tracking

The video tracker may be operated in a mode to acquire and track small, low-contrast targets under very low SNR (Signal-to-Noise Ratio) conditions. In steady state, the target contrast SNR for video processed by the correlation recursive reference function is enhanced by:

$$\left(\frac{2 - W_1}{W_1}\right)^{\frac{1}{2}}$$

where $W_1$ is the recursive reference update rate factor.

Thus, by delivering the video correlation recursive reference to the input of the centroid processor 32, the video SNR for the centroid processor 32 is substantially enhanced. In fact, the target contrast SNR is enhanced by the square root of 3 for a recursive reference update rate factor of $\frac{1}{2}$. In this mode of operation, correlation error processing is not executed but the recursive reference is utilized. The centroid initial acquisition sequence is not executed until two video frames after the correlation recursive reference is loaded. The centroid gate control functions are similar to those described for the dedicated centroid track mode and track state transitions are determined by the centroid track status indications alone. Prior to receiving centroid track-valid (which initiates actual tracking), the correlation recursive reference position is fixed and the correlation gate edges are positioned on top of the centroid gate edges. When active tracking is initiated, the correlation gate edges are still positioned on top of the centroid gate edges, but the correlation recursive reference position is moved so as to correspond with the centroid gate center position. In this mode, the realizable track loop bandwidth is reduced because the video averaging delay is included within the closed track loop.

Complementary Mode Tracking

The track loop bandwidth limitation associated with the use of the correlation recursive reference video for centroid tracking can be avoided while still preserving the SNR enhancement. In this mode, the correlation processor error inputs that normally provide error signals to the drift-remover function are used in conjunction with the centroid errors.

The correlation errors are a measure of the frame-to-frame error between the target location in the incoming scene and the reference scene. The centroid errors are a measure of the target location in the reference scene relative to the centroid gate. The combination of these two errors form a complementary function in the frequency domain.

For example, the centroid error transfer function is defined by $$\frac{\theta_{ecent}}{\theta_{target}} = \frac{1}{\tau S + 1}$$

where $\tau$ is a time constant determined by the correlation recursive reference update rate. Similarly, the correlation error transfer function is defined by $$\frac{\theta_{ecent}}{\theta_{target}} = \frac{\tau S}{\tau S + 1}$$

Thus, when the two preceding transfer functions are combined:

$$\theta_e = \theta_{ecent} + \theta_{ecorr}$$

or, $$\theta_e = \theta_{target}\left[\frac{1}{\tau S + 1} + \frac{\tau S}{\tau S + 1}\right] = \theta_{target}$$

Thus, the complementary mode yields centroid tracking jitter characteristics that are improved by the use of video with an enhanced SNR and an error measurement bandwidth that is maintained by using the correlation error terms.

Tracking is initiated in the dedicated correlation processing mode, and after a designated target is established in the correlation recursive reference, the correlation reference is positioned in the field-of-view so as to null the centroid error. Once this is accomplished, the accumulated error terms computed in the correlation drift compensation computation are replaced with the centroid errors. As was the case for the automatic mode, track state control is implemented by the use of track status indications for the two processors 30, 32. Correlation track status is the primary control, however. That is, transitions to Coast or Loss of Lock states are executed as a function of the correlation track status. If the centroid track status degrades from satisfactory, correlation tracking is reinstated.

In accordance with the foregoing, the invention provides a fully automatic dual mode video tracker having substantially improved performance and tracking accuracy. Many variations and modifications to the preferred embodiment chosen to illustrate the invention may be made by those skilled in the art, without departing from the spirit and scope of the present contribution to the art. Accordingly, it is to be understood that the preferred embodiment described herein is merely illustrative, and that the protection sought and to be afforded hereby should be deemed to extend to the subject matter claimed and all equivalents thereof.

What is claimed is:

1. A method of establishing a size of a correlation tracking gate in a correlation tracking system of a type which generates tracking error signals from input electromagnetic video signals $V_{i,j}(k)$ utilized to form one video frame k of a two-dimensional image plane having coordinates $(\epsilon, \eta)$ where $\epsilon$ represents an elevation and $\eta$ represents an azimuth, said image plane being defined by a plurality of pixels each having a discrete location (i,j) in the image plane along coordinates $\epsilon$ and $\eta$ respectively and wherein said tracking gate is defined by edges associated with N×M pixels along coordinates $\eta$ and $\epsilon$ respectively, said method comprising the steps of:

(a) generating a reference map value for each pixel according to the relationship $$MAP_{ij}(k) = W_1 V_{ij}(k) + (1 - W_1) MAP_{ij}(k-1)$$

where $W_1$ is a weighting factor having a value $0 \leq W_1 \leq 1$;

(b) generating a first weighting function $We_{ij}(k)$ related to pixels along the $\epsilon$ coordinate;

(c) generating a second weighting function $Wd_{ij}(k)$ related to pixels along the $\eta$ coordinate;

(d) generating first and second respective correlation error signals $\delta'_d(k)$ and $\delta'_e(k)$ for each image plane frame using the first and second weighting functions $We_{ij}(k)$ and $Wd_{ij}(k)$ and a difference video function $\Delta V_{ij}(k)$, the first and second correlation error signals being expressive of a tracking error associated with the tracking gate;

(e) generating a gradient function $GF_{ij}(k)$ for each pixel within a gradient gate defined by edges associated with Y×Z pixels, according to the relationship $$GF_{ij}(k) = |WE_{ij}(k)| + |Wd_{ij}(k)|,$$

an average value of the gradient function $GF_{ij}(k)$ over the gradient gate representing a measure of an information content within the tracking gate;

(f) adjusting a size of the gradient gate to maximize the average value of $GF_{ij}(k)$ over the gradient gate; and (g) establishing a size of the tracking gate such that a margin having a width of X pixels is provided between the edges of the tracking gate and the edges of the gradient gate.

2. The method of claim 1, wherein said first weighting function $We_{ij}(k)$ is defined by the relationship $$We_{i,j}(k) = \frac{-MAP_{i+1,j}(k-1)(k-1) + MAP_{i-1,j}(k-1)}{2\Delta e}$$

where $\Delta e$ is a dimension of each pixel in said image along the $\epsilon$ coordinate, and said second weighting function $Wd_{ij}$ is defined by the relationship $$Wd_{ij}(k) = \frac{-MAP_{ij+1}(k-1) + MAP_{ij-1}(k-1)}{2\Delta d}$$

where $\Delta d$ is a dimension of each pixel in said image plane along the $\eta$ coordinate.

3. The method of claim 1, including the step of storing at least one frame plus one line of reference map values $MAP_{ij}$ in a memory.

4. The method of claim 1, step (e) is performed by accumulating said gradient function $GF_{ij}(k)$ over an entire gradient gate.

5. The method of claim 1, wherein the step of adjusting the size of the gradient gate includes the steps of:

(a) repositioning the edges of the gradient gate by a predetermined increasing or decreasing number of pixels;

(b) calculating the average value of the gradient function $GF_{ij}(k)$ over the gradient gate;

(c) comparing the average value of the calculated gradient function to a value calculated previous to the step of repositioning;

(d) determining if the average value calculated in step (b) is greater than a value calculated previous to the step of repositioning; and (e) maximizing the average value of $GF_{ij}(k)$ over the gradient gate by recursively performing step (a), (b), (c) and (d) until the edges of the gradient gate are positioned such that if the edges are further increased by the predetermined number of pixels the average value of the gradient function $GF_{ij}(k)$ over the gradient gate will be caused to decrease.

6. The method of claim 1, wherein said reference map value $MAP_{ij}(k)$ is generated on a frame by frame basis.

7. The method of claim 1, wherein said first and second correlation error signals $\delta'_d(k)$ and $\delta'_e(k)$ are defined by the relationships $$\delta'_d(k) = \left[ E_d(k) - E_e\left(\frac{C_{ed}(k)}{C_e(k)}\right) \right] \left[ \frac{2}{C_d\left(1 - \frac{C_{ed}(k)^2}{C_e(k)C_d(k)}\right)} \right]$$

$$\delta'_e(k) = \left[ E_e(k) - E_d\left(\frac{C_{ed}(k)}{C_d(k)}\right) \right] \left[ \frac{2}{C_d\left(1 - \frac{C_{ed}(k)^2}{C_e(k)C_d(k)}\right)} \right]$$

$$E_e(k) = \sum_{i=1}^{Ne} \sum_{j=1}^{Nd} We_{ij}(k)[V_{ij}(k) - MAP_{ij}(k-1)],$$

$$E_d(k) = \sum_{i=1}^{Ne} \sum_{j=1}^{Nd} Wd_{ij}(k)[V_{ij}(k) - MAP_{ij}(k-1)],$$

where, $$C_e(k) = \sum_{i=1}^{Ne} \sum_{j=1}^{Nd} We_{ij}^2(k),$$

$$C_d(k) = \sum_{i=1}^{Ne} \sum_{j=1}^{Nd} Wd_{ij}^2(k), \text{ and}$$

$$C_{ed}(k) = \sum_{i=1}^{Ne} \sum_{j=1}^{Nd} Wd_{ij}(k)We_{ij}(k).$$

8. A method of determining correlation track quality in a correlation tracking system of a type which generates tracking quality error signals from input electromagnetic video frame k of a two-dimensional image plane having coordinates $(\epsilon, \eta)$ where $\epsilon$ represents an elevation and $\eta$ represents an azimuth, said image plane being defined by a plurality of pixels each having a discrete location (i,j) in the image plane along coordinates $\epsilon$ and $\eta$ respectively, and wherein correlation is performed over a track gate defined by NxM pixels along coordinates $\epsilon$ and $\eta$ respectively, said method comprising the steps of:

(a) recursively generating a reference map for each pixel according to the relationship $$MAP_{ij}(k) = W_1 V_{ij}(k) = (1 - W_1) MAP_{ij}(k-1)$$

where $W_1$ is a weighting factor having a value $0 \leq W_1 \leq 1$;

(b) subtracting reference map values $MAP_{ij}(k)$ from video signals $[V_{ij}(k)]$ $V_{ij}(k)$ of a subsequent frame to produce a difference video function $[V_{ij}(k)]$ $\Delta V_{ij}(k)$;

(c) generating a first weighting function $We_{ij}(k)$ related to pixels along the $\epsilon$ coordinate;

(d) generating a second weighting function $Wd_{ij}(k)$ related to pixels along the $\eta$ coordinate;

(e) generating first and second respective correlation error signals $\delta'_d(k)$ and $\delta'_e(k)$ for each image plane frame using said first and second weighting functions $We_{ij}(k)$ and $Wd_{ij}(k)$ and the difference video function $\Delta V_{ij}(k)$, the first and second correlation error signals being expressive of a tracking error associated with the tracking gate;

(f) summing a value of the difference video function $\Delta V_{ij}(k)$ over said track gate for each image plane frame to produce a sum, the value of the sum being indicative of an amount of clutter interference occurring within the track gate;

(g) generating a gradient function $GF_{ij}(k)$ for each pixel in a gradient gate defined by YxZ pixels according to the relationship $$GF_{ij}(k) = |We_{ij}(k)| + |Wd_{ij}(k)|;$$

(h) summing the gradient function $GF_{ij}(k)$ over the gradient gate for each image plane; and (i) generating an indication of track quality using the summed value of the difference video $\Delta V_{ij}(k)$ and the summed gradient function $GF_{ij}(k)$.

9. The method of claim 8 wherein step (i) includes the substeps of:

(i$_1$) dividing said summed value of the difference video $\Delta V_{ij}(k)$ by an area of the track gate, and (i$_2$) comparing a quantitative result of substep (i$_1$) with a preselected reference value indicative of an amount of clutter interference, a relationship of said result to said references value providing an indication of correlation track quality.

10. The method of claim 9, wherein step (i) further includes the substeps of:

(i$_3$) dividing said summed gradient function $GF_{ij}(k)$ by an area of the gradient gate, (i$_4$) comparing a magnitude of said summed gradient function $GF_{ij}(k)$ to a preselected reference value, indicative of an amount of clutter of interference, and (i$_5$) comparing a quantitative result of substep (i$_3$) with a preselected reference value indicative of an amount of clutter interference, the comparison performed in substeps (i$_4$) and (i$_5$) providing an indication of correlation track quality.

11. The method of claim 8, wherein said first weighting function $We_{ij}(k)$ is defined by the relationship $$We_{ij}(k) = \frac{-MAP_{i+1,j}(k-1) + MAP_{i-1,j}(k-1)}{2\Delta e}$$

where $\Delta e$ is the dimension of each pixel in said image along the $\epsilon$ coordinate, and said second weighting function $Wd_{ij}$ is defined by the relationship $$Wd_{ij}(k) = \frac{-MAP_{ij+1}(k-1) + MAP_{ij-1}(k-1)}{2\Delta d}$$

where $\Delta d$ is the dimension of each pixel in said image plane along the $\eta$ coordinate.

12. The method of claim 8, wherein said first and second correlation error signals $\delta'_d(k)$ and $\delta'_e(k)$ are defined by the relationships $$\delta'_d(k) = \left[ E_d(k) - E_e\left(\frac{C_{ed}(k)}{C_e(k)}\right) \right] \left[ \frac{2}{C_d\left(1 - \frac{C_{ed}(k)^2}{C_e(k)C_d(k)}\right)} \right]$$

$$\delta'_e(k) = \left[ E_e(k) - E_d\left(\frac{C_{ed}(k)}{C_d(k)}\right) \right] \left[ \frac{2}{C_d\left(1 - \frac{C_{ed}(k)^2}{C_e(k)C_d(k)}\right)} \right]$$

where, $$E_e(k) = \sum_{i=1}^{Ne} \sum_{j=1}^{Nd} We_{ij}(k)[V_{ij}(k) - MAP_{ij}(k-1)],$$

$$E_d(k) = \sum_{i=1}^{Ne} \sum_{j=1}^{Nd} Wd_{ij}(k)[V_{ij}(k) - MAP_{ij}(k-1)],$$

where, $$C_e(k) = \sum_{i=1}^{Ne} \sum_{j=1}^{Nd} We_{ij}^2(k),$$

$$C_d(k) = \sum_{i=1}^{Ne} \sum_{j=1}^{Nd} Wd_{ij}^2(k), \text{ and}$$

$$C_{ed}(k) = \sum_{i=1}^{Ne} \sum_{j=1}^{Nd} Wd_{ij}(k)We_{ij}(k).$$

13. A device for automatically tracking a target, and of a type which generates tracking error signals from input electromagnetic video signals derived from a target scene and utilized to form successive video frames of a two dimensional image plane, said image plane being defined by a plurality of pixels each having an intensity value and a discrete location in the image plane, said device comprising:

an input for receiving said input video signals;

a first video processor for processing said input video signals and for generating a first set of tracking error signals, said first video processor including:

(1) first input means for receiving said input video signals from said input, (2) means connected with said first input means for generating a pixel intensity threshold value, (3) means for comparing the intensity value of said input video signals with said threshold value and for computing a centroid of pixels in said image plane, the computed centroid being comprised of pixels which, for a desired contrast between the centroid and a background, have an intensity value which is greater than or which is less than said threshold value;

a second video processor for processing said input video signals and for generating a second set of tracking error signals, said second video processor including:

(1) second input means for receiving said input video signals from said input, and for generating therefrom on a frame by frame basis a current map of pixel intensity values for a current video frame, (2) storage means connected with said second input means for storing the current map of pixel intensity values for a current video frame, and, means for delivering said map of pixel intensity values from said storge means to said first input means, whereby the input video signals received by said first processor are combined during a subsequent video frame with said map of pixel intensity values.

14. The device of claim 13, wherein said second input means includes means for subtracting pixel intensity values of the current frame from the pixel intensity values of the previous frame to produce difference video signals, said device further including means for delivering said difference video signals from said second input means to said first input means, whereby the input voice signals received by said first processor are combined with said difference video signals.

15. A device for automatically tracking a target, and of a type which generates tracking error signals from input electromagnetic signals derived from a target scene and utilized to form successive video frames of a two dimensional image plane, said image plane being defined each having an intensity value and a discrete location in the image plane, said device comprising:

an input for receiving said input video signals;

a first video processor for processing said input video signals and for generating a first set of tracking error signals, said first video processor including:
(1) first input means connected with said input for receiving said input video signals,
(2) means connected with said first input means for generating a pixel intensity threshold value,
(3) means for comparing the intensity values of said input video signals with said threshold value and for computing a centroid of pixels in said image plane, the computed centroid being comprised of pixels which, for a desired contrast between the centroid and a background, each have a given intensity value which is greater than or which is less than said threshold value;

a second video processor for processing said input video signals for generating a second set of tracking error signals, said second video processor including:
(1) second input means for receiving said input video signals from said input.
(2) first storage means connected with said second input means for storing pixel intensity values of a current video frame,
(3) means connected with said first storage means for subtracting pixel intensity values stored in said first storage means from the intensity values of the input video signals received by said second input means to produce difference video signals; and means for delivering said difference video signals from said subtracting means to said first input means, whereby said difference video signals are combined with the input video signals supplied to said first processor.

16. The device of claim 15, wherein said second video processor includes second storage means connected with said first storage means for storing pixel intensity of a video frame preceding said current video frame, and said device further includes means for delivering pixel values of the preceding video frame from said second processor to said first input means, whereby to combine the pixel values of said preceding video frame with the values of the input video signals received by said first processor.

* * * * *